United States Patent [19]
Yoo et al.

[11] Patent Number: 5,172,782
[45] Date of Patent: Dec. 22, 1992

[54] PIVOT MOUNT OF ELEVATOR LOAD-WEIGHING AT CAR HITCH

[75] Inventors: Young S. Yoo, Avon; Eric K. Jamieson, Farmington, both of Conn.

[73] Assignee: Otis Elevator Company, Farmington, Conn.

[21] Appl. No.: 792,978

[22] Filed: Nov. 15, 1991

[51] Int. Cl.$^5$ .................... G01G 19/14; G01G 23/02; B66C 13/16
[52] U.S. Cl. ................... 177/147; 177/132; 177/255; 177/154; 212/158
[58] Field of Search ............... 177/147, 154, 255, 132; 212/158

[56] References Cited
U.S. PATENT DOCUMENTS
3,747,402 7/1973 Branham et al. .................. 177/147

FOREIGN PATENT DOCUMENTS
0659384 10/1951 United Kingdom ............... 177/147

Primary Examiner—George H. Miller, Jr.
Attorney, Agent, or Firm—Breffni X. Baggot

[57] ABSTRACT

The invention weighs an elevator car independently of variations in load distribution within the car and variations in the tension distribution in rods and ropes from which the car is suspended. This is accomplished by means of a top hitch plate, a middle hitch plate, and a bottom hitch plate, which are arranged such that the bottom hitch plate has a pivot 16 mounted on it with the middle hitch plate being mounted on the pivot 16 and a load cell and a support being mounted on the middle hitch plate 17 outboard of the rods from which the car 2 is supported. The top hitch plate is connected to a crosshead at its upper surface. The load cell and support bear against the top hitch plate when there is tension in the rods from the weight of the car 2.

8 Claims, 3 Drawing Sheets

PIVOT MOUNT OF ELEVATOR LOAD-WEIGHING AT CAR HITCH

TECHNICAL FIELD

This invention relates to the weighing of an elevator car.

BACKGROUND OF THE INVENTION

It is important to the function of an elevator that its load be known at all times—whether to determine if the car is overloaded so that the elevator brake is not released while under that load or to determine which floor should be serviced based on the load in the car. Several types of elevator load weighing systems have been used.

Elevator load weighing systems may be divided into two groups—those that place a sensor beneath the cab platform and those that do not.

Several systems have been designed with the load weigher beneath the car. Some measure the deformation of resilient pads beneath the car platform, U.S. Pat. No. 4,078,623. A disadvantage of the deformation systems is the inaccuracy introduced by hysteresis in the elastomeric material used in the pads. U.S. Pat. No. 4,899,852 discloses an elevator car disposed in a frame which moves on rails through a hoistway; a pendulum mount is used to mount the car in the frame so that the car is free to swing from four suspension rods within the frame in pendulum fashion. Two of the four suspension rods extend through a support pad, a rubber pad, and a second support pad. There is no positive connection between the load cell and support pads. The two support pads sandwich the rubber pad. Below two corners of the car, a load cell separates the pads. This device involves deflection in the load cell in response to weight on the cab floor. Devices, like that of U.S. Pat. No. 4,899,852, involve deflection in response to the weight exerted on the cab floor. There are several problems. First, there is drift in the signal produced by the actuator due to hardening of the elastomeric pads. Typically, the platform is supported at some places by wooden blocks and rubber pads and at other places by load cells supported by rubber pads. But the hardness of the rubber pads increases from the time the elevator is installed. And, the hardness of different rubber pads increases at different rates, such that a load evenly distributed on a cab platform is not carried equally by different pads. In addition, accurate load measurement requires that the load cells and rubber pads should be under uniform pressure; achieving this is time consuming and difficult. Further, the load weight measurement typically depends on a linear relationship, over a range of weights to be measured, between deflection of a load cell actuator and a load of, for example, 0 to 3000 pounds. On installation, the relationship may be linear but because of the aging of the rubber pads, it becomes nonlinear for a portion of the range of weights to be measured. The result is an erroneous load measurement. When error in the load measurement becomes excessive, the use of the load weigher is undermined almost totally. For example, if the average elevator passenger weighs 150 pounds and the range is 0 to 2000 pounds, the resolution error is greater than 5% so that it cannot be determined whether or not one person is in the car. Frequently, adolescents will get on an elevator and press all the buttons. Anti-nuisance software estimates the number of people in a car by assuming an average weight per person. It then determines the number of car calls and if the number of car calls exceeds the number of people estimated call, it cancels those car calls. If a load weigher cannot distinguish the weight of an average person, this software cannot operate.

It is desirable to weigh the load in a manner independent of the distribution of the load within the cab. Copending application "Elevator Load Weighing at Car Hitch" discloses achieving this by means of a load cell and support sandwiched between a top and bottom hitch plate, the load being shared between the load cell and support. Threaded rods pass through the top and bottom plates, as well as the space between the top and bottom hitch plates, and further pass through springs and connect to spring seats and nuts on rods. The upper ends of the rods are connected to the hoist ropes. The load weighing apparatus further includes a pair of rod stabilizers which keep constant the lateral displacement of the rods one from another. The load cell and support are not enclosed by the rods, yielding the further advantage that a mechanic has easy access to the load cell for its maintenance. However, this solution has two problems. The first problem is the cause of slippage in the ropes and, because the relative position of the rope and sheave groove is not constant, different load measurements are obtained depending upon whether the elevator is traveling up or down when it arrives at a given position, and whether it has arrived at a given position twice. In other words, when the actual tension in the individual rope supporting the bottom hitch plate changes due to individual sheave groove diameter differences, the actual center of load in the bottom hitch plate will wander. This wandering center of load has the potential of introducing significant error in the load measurement by means of altering the effective ratio of loading between the load cell and other support points. For example, the load measurement at floor 5 when traveling in the up direction is different from the load measurement obtained when traveling to floor 5 in a down direction. In addition, the load measurement at floor 5 after traveling from floor 6 to floor 5 is different from the load measurement obtained after traveling from floor 7 to floor 5.

The second problem with the above hitch load weighing device is that there is no overload protection on the load cell.

DISCLOSURE OF THE INVENTION

It is the object of the present invention to weigh an elevator car in a manner independent of variations in load distribution within the car and variations in the tension distribution in rods and ropes from which the car is suspended. This is accomplished by means of two top hitch plates, a middle hitch plate, and a bottom hitch plate, these being arranged such that the bottom hitch plate has a pivot mounted on it with the middle hitch plate being mounted on the pivot and a load cell and a support being mounted on the middle hitch plate outboard of rods from which the car is supported. The top hitch plate is connected to the load support crosshead at its upper surface. The load cell and support bear against the top hitch plate when there is tension in the rods from the weight of the car.

It has been observed that the varying vertical loads in each rope due to sheave groove irregularities are the main cause of some of the vertical vibration problems encountered in some hoistways. These vibrations will be minimized with the pivot arrangement proposed here. Unbalanced tensions will not tilt the frame of the car because the loads are transmitted through the pivot.

DETAILED DESCRIPTION OF THE INVENTION

Figure 1:
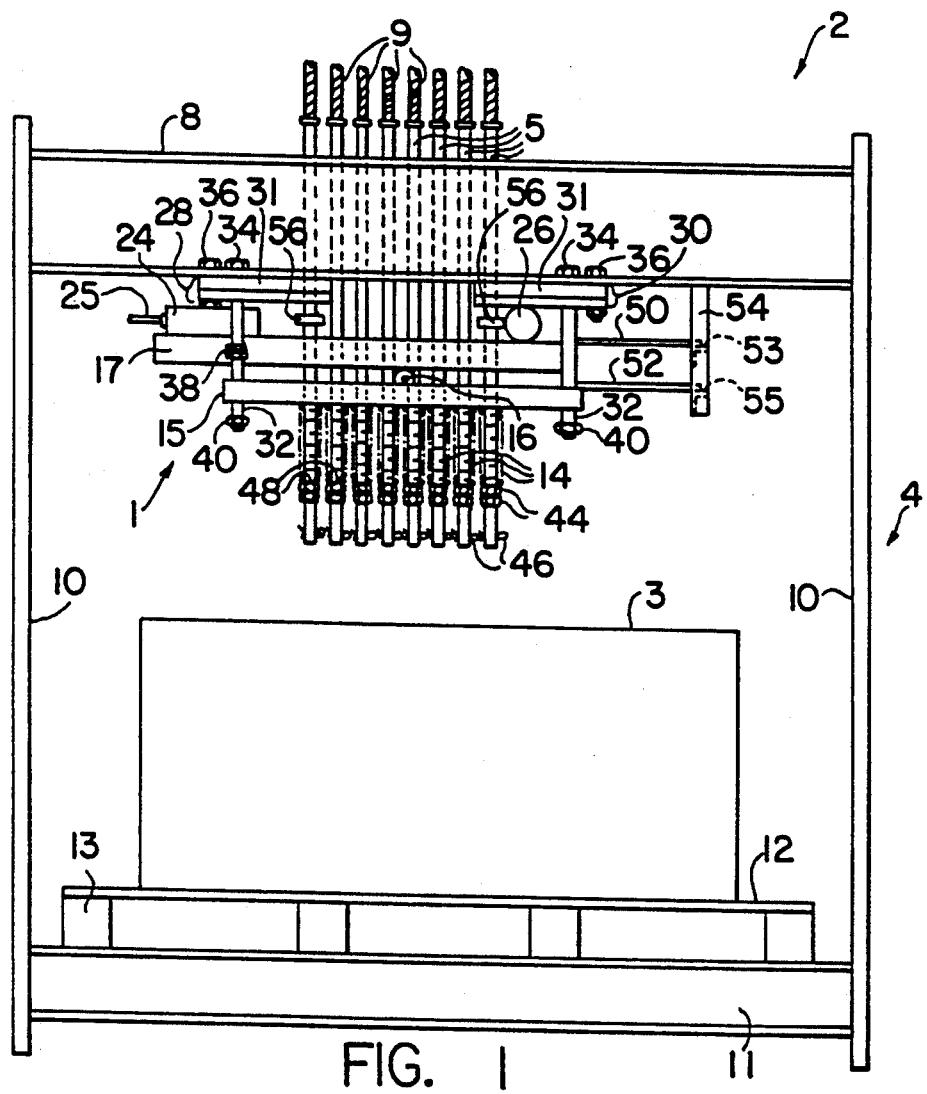
FIG. 1 is a front view of a load weighing assembly and car.
Figure 3:
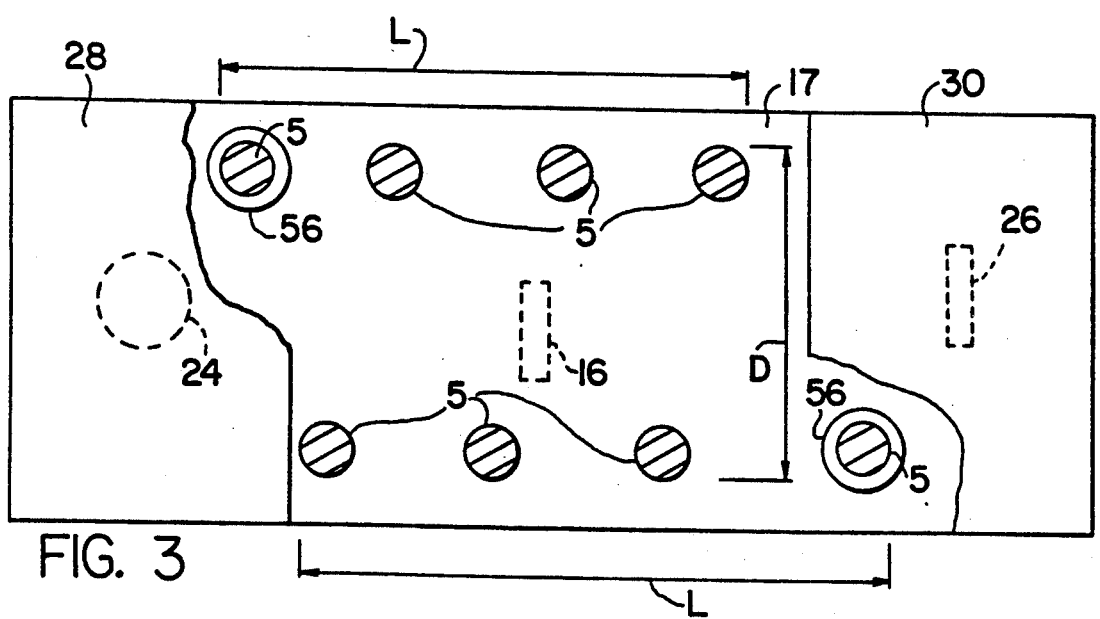
FIG. 3 shows a top view of the load weighing apparatus.
Figure 2:
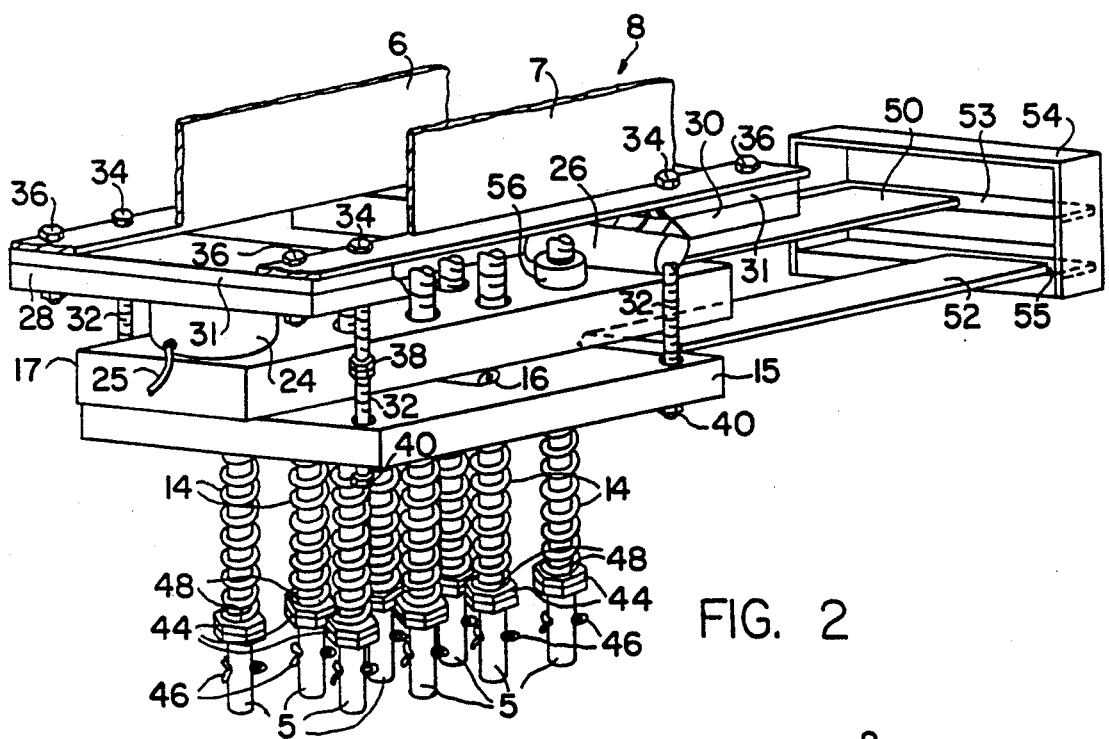
FIG. 2 is a perspective view of the load weighing assembly.

FIG. 1 is a front view of a load weighing assembly 1 for weighing a car 2, including a cab 3 and a frame 4, suspended from threaded rods 5 passing between two parallel beams 6, 7 (FIG. 2) of a load support crosshead 8. Each rod 5 hangs from a rope 9. The frame 4 includes two uprights 10, a safety plank 11, and the load support 8. The cab 3 sits atop a platform 12 which sits on rubber pads 13. The weight of the car 2 biases hitch springs 14 (surrounding rods 5) against a bottom plate 15. The rods 5 are arranged in a front row of four rods 5 and a back row of four rods 5 (FIGS. 2 and 3). The hitch springs 14 are compression springs—rigid horizontally but flexible vertically.

In FIG. 1, centered on the bottom hitch plate 15, is a pivot 16 on which a middle hitch plate 17 sits. At one end of said middle hitch plate 17 and to one side of rods 5 is a load cell 24 sitting on middle hitch plate 17 for providing a load signal on a wire 25. At another end of said middle hitch plate 17 and to another side of said rods 5 is a support 26 mounted on the middle hitch plate 17. Tension in the rods 5 causes the pivot 16 to bear against the middle hitch plate 17 which in turn causes the load cell 24 and support 26 to bear against a first and a second top hitch plate 28, 30. Each top hitch plate 28, 30 includes a rubber sound isolation layer 31. The pivot 16 is a cylinder turned on its side so that the pivot has line contact with the middle and bottom hitch plates 15, 17. Therefore, the pivoting action is side to side. The load cell 24, support 26, and pivot 16 are all welded to the middle hitch plate 15.

In FIG. 1, the first and second top hitch plates 28, 30 are connected to the load support 8 by means of four nut-bolt combinations 36. Four threaded jack bolts 32 and four nuts 34 accomplish three ends. First, they keep the load weighing assembly 1 together during shipment. Second, turning a jack bolt nut 38 causes the first top hitch plate 28 and bottom hitch plate 15 to separate such that a mechanic can replace or repair the load cell 24. Third, the jack bolts 32 protects the load cell 24 when the load weighing assembly 1 might otherwise descend. Should the car 2 hit a buffer (not shown) and the counterweight (not shown) jump, the ropes 9 would descend in the direction of the load weighing assembly 1. With no tension in the ropes 9 to suspend the load weighing assembly 1, it would fall except for the jack bolts 32. Therefore, the jack bolts 32 function as a down load cell protection device.

There is a clearance between a retaining bolt 40 beneath the bottom hitch plate 15, and no load is carried by the jack bolts 32. Without a clearance, the jack bolts 32 would take load off the pivot 16. The hitch spring 14 sits within a seat 48 on nuts 44.

In FIG. 1, twisting of the top, bottom, and middle hitch plates is minimized by middle and bottom stabilizer plates 50, 52. The middle stabilizer plate 50 is connected at one end to middle hitch plate 17 and at another end to a shelf 53 on a bracket 54. The bottom positioner plate 52 is connected at one end to bottom hitch plate 15 and at another end to a shelf 55 on bracket 54. The bracket 54 is connected to load support 8.

The load on the load support 8 is shared between the load cell 24 and the support 26, which, like the pivot, is a cylinder turned on its side. The load on the load support 8 is transferred to the bottom hitch plate 15 by means of the pivot 16. The bottom hitch plate 15 transfers the load on the load support 8 to the ropes 9 by means of the hitch springs 14.

In FIG. 1, whereas jack bolts 32 protect load cell 24 when load weighing assembly 1 might otherwise descend, protection collars 56 bolted onto rods 5 provide protection against load cell overload when load weighing assembly 1 might otherwise ascend—such as during buffer strikes, safety engagements or even normal elevator acceleration where load cell 24 is loaded near capacity. The collars 56 therefore function as an up load cell protection device. When the overload occurs, hitch springs 14 compress and collars 56 move upward. When protection collars 56 strike the bottom of top hitch plates 28, 30, they provide an auxiliary load path around load cell 24, circumventing damage to load cell 24.

In FIG. 1, when individual rope tension changes, middle hitch plate 17 will move slightly until equilibrium is reached. This motion is very small because the differential force between the tensions in the left side is resisted by the tensions in the right side. Because the bottom hitch plate 15 is free to pivot, the center of the load on the load support 8 coincides with the axis of the pivot 16; thus, the ratio of the load passing through load cell 24 and support 26 remains constant. The bottom hitch plate 15 and pivot 16 are required because the tension in the individual ropes 9 can change as a function of irregularities in machine sheave grooves. Adjustment of nuts 44 affects the compression of hitch springs 14, thereby affecting rope tension. When the car 2 is being installed in a building, this adjustment is done to equalize tension among the ropes 9 with the result that the restraining action of the hitch springs 14 ensures that the bottom hitch plate 15 will not tilt so far that its edges contact middle hitch plate 17. With a constant center of load in the middle hitch plate 17, the ratio of load at the load support 8 versus the load at the load cell 24 is fixed.

FIG. 2 is a perspective view of the load weighing apparatus shown in FIG. 1.

FIG. 3 shows a top view of the load weighing assembly 1 showing only the rods 5, middle hitch plate 17, pivot 16, load cell 24, support 26, top hitch plates 28, 30, and protection collars 56. One object of the invention is load measurement independent of variations in the tension distribution in the ropes 9. Because this tension distribution affects the load measurement in only one plane, a line pivot is used so that the middle hitch plate 17 may pivot in that plane. The pivot 16 is a cylinder turned on its side in a direction perpendicular to the front row. The span L of the rods 5 in each row is like the beam of a seesaw; it is long relative to the distance D between the front and back rows. A difference in tension between the front row rods and from the back row rods affects the load cell 24 and support 26 equally and therefore does not affect a load measurement, so there is no need for pivoting in a plane perpendicular to the front and back rows.

Figure 4:
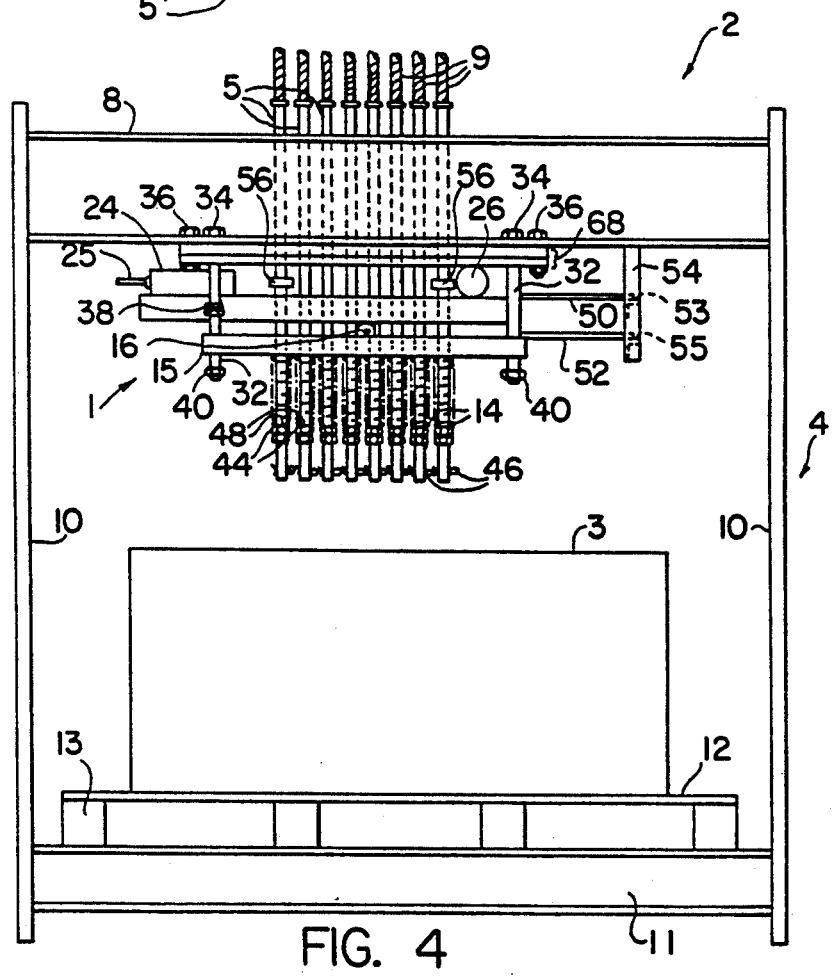
FIG. 4 is a front view of a load weighing assembly and car wherein a single top plate and a single bottom plate is used.

FIG. 4 is a front view of a second embodiment of a load weighing assembly and car 2 wherein a single top hitch plate 8 is used.

Figure 5:
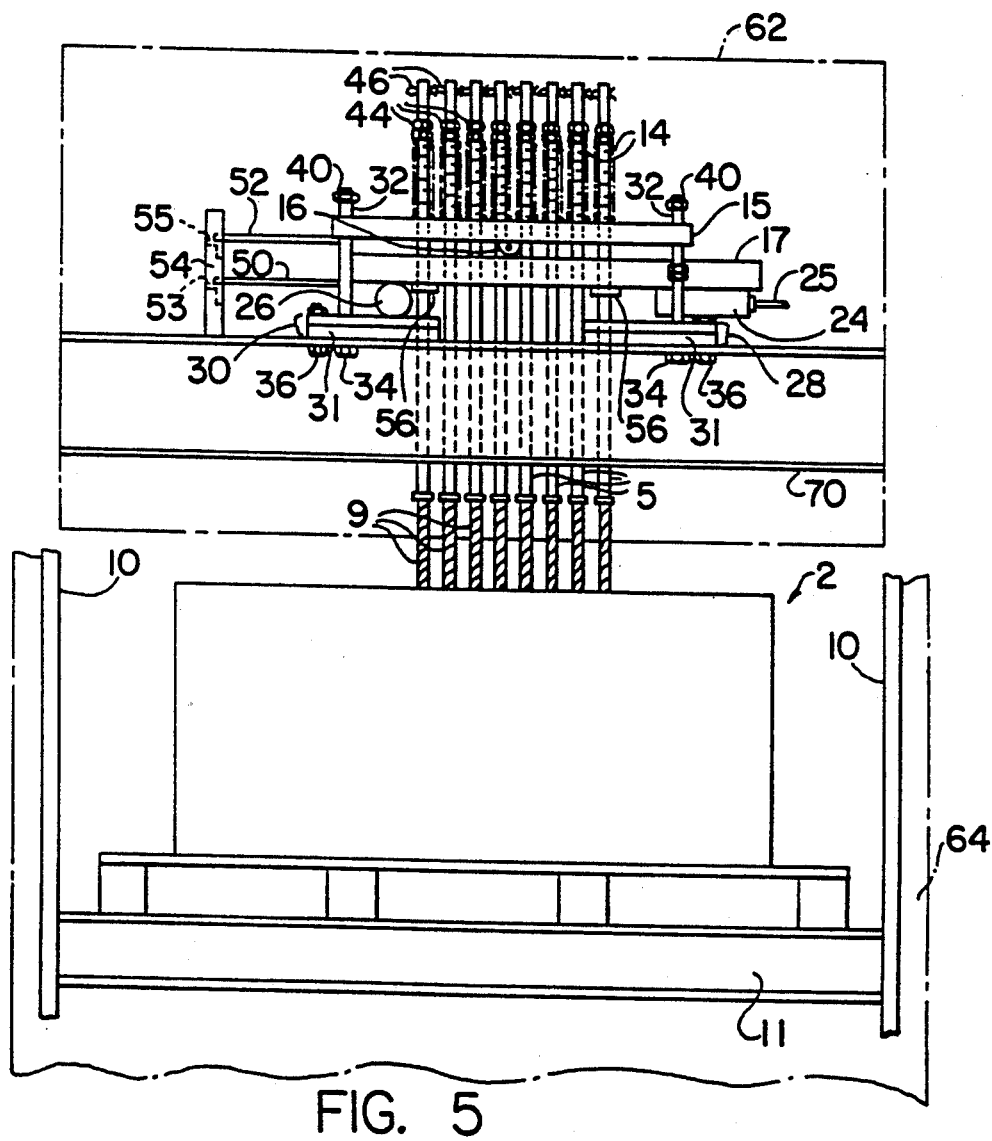
FIG. 5 discloses a third embodiment of a loadweighing assembly.

FIG. 5 discloses a third embodiment of the load weighing assembly where the car 2 is suspended from the ropes 9 and the load support crosshead 70 is in a machine room 62 above the hoistway 64. The load weighing assembly 1 in the first and second embodiments is inverted here. The weight of the car 2 on the rods 5 causes the load cell 25 to provide a signal representative of the car load.

We claim:

1. A load weighing assembly in combination with an elevator car, said load weighing assembly hanging from a plurality of rods, said car having a crosshead, said load weighing assembly comprising:
   a bottom hitch plate biased toward said crosshead by springs enclosing said rods, said bottom hitch plate having two or more holes for receiving said rods, and having a pivot mounted thereon for causing said rods to carry equal load;
   a middle hitch plate sitting on said pivot, said middle plate having two or more holes for receiving said rods;
   a load cell mounted on a top surface of said middle hitch plate at an end to one side of said rods for providing the load of the car;
   a support mounted on said top surface of said middle hitch plate at another end thereof opposite said load cell; and
   a top hitch plate means having a top surface and a bottom surface, said top surface coming to bear against said crosshead when said load cell and support are brought to bear against the bottom surface of said top hitch plate means by the weight of said elevator car upon said rods.

2. The load weighing assembly of claim 1, wherein said top hitch plate means includes two separate top hitch plates, one against which said load cell bears and another against which said crosshead bears.

3. The load weighing assembly of claim 1, further comprising at least two collars around at least two of said rods disposed between said top hitch plate and said middle hitch plate for engaging said top hitch plate thus providing an auxiliary load path around said load cell and circumventing damage to load cell when said load weighing assembly ascends toward said crosshead.

4. The load weighing assembly of claim 1, further comprising a pair of threaded bolts, securing said top hitch plate to said bottom hitch plate, and a nut secured to each of said bolts for allowing said top hitch plate and said bottom hitch plate to be separated when said nuts are turned against said bottom hitch plate.

5. An up load cell protection device in combination with a load weighing assembly and an elevator car, said load weighing assembly hanging from a plurality of rods, said car having a crosshead, said load cell protection device comprising:
   a first hitch plate means biased toward said crosshead by springs enclosing said rods, said first hitch plate means having two or more holes for receiving said rods;
   a load cell mounted on said first hitch plate means at an end to one side of said rods for providing the load of the car;
   a support mounted on said first hitch plate means at another end thereof opposite said load cell, said support and load cell being disposed along a common horizontal axis;
   a second hitch plate means having a top surface and a bottom surface, said top surface coming to bear against said crosshead when said load cell and support are brought to bear against the bottom surface of said second hitch plate means by the weight of said elevator car upon said rods, said second hitch plate means having two or more holes for receiving said rods; and
   protection collars disposed on at least two of said rods between said first plate means and said second hitch plate means for engaging said second hitch plate means thus providing an auxiliary load path around said load cell and circumventing damage to load cell when said load weighing assembly ascends toward said crosshead.

6. The up load cell protection device of claim 5, further including a bottom hitch plate biased toward said crosshead by springs enclosing said rods, said bottom hitch plate having two or more holes for receiving said rods, and having a pivot mounted thereon for causing said rods to carry equal load.

7. The up load cell protection device of claim 5, further comprising a pair of threaded bolts, securing said second hitch plate means to said bottom hitch plate, and a nut secured to each of said bolts for allowing said second hitch plate means and said bottom hitch plate to be separated when said nuts are turned against said bottom hitch plate.

8. A down load cell protection device in combination with a load weighing assembly and an elevator car, said load weighing assembly hanging from a plurality of rods, said car having a crosshead, said load cell protection device comprising:
   a first hitch plate means biased toward said crosshead by springs enclosing said rods, said first hitch plate means having two or more holes for receiving said rods;
   a load cell mounted on said first hitch plate means at an end to one side of said rods for providing the load of the car;
   a support mounted on said first hitch plate means at another end thereof opposite said load cell, said support and load cell being disposed along a common horizontal axis;
   a second hitch plate means having a top surface and a bottom surface, said top surface coming to bear against said crosshead when said load cell and support are brought to bear against the bottom surface of said second hitch plate means by the weight of said elevator car upon said rods, said second hitch plate means having two or more holes for receiving said rods; and
   a pair of threaded bolts, securing said first hitch plate to said second hitch plate, and a nut secured to each of said bolts for allowing said plates to be separated when said nuts are turned against one of said plates.

* * * * *